(12) United States Patent
Prasanna et al.

(10) Patent No.: US 8,589,935 B2
(45) Date of Patent: Nov. 19, 2013

(54) HETEROGENEOUS RECONFIGURABLE AGENT COMPUTE ENGINE (HRACE)

(75) Inventors: Deepak Prasanna, Rockwall, TX (US); Gerald L. Fudge, Rockwall, TX (US)

(73) Assignee: L-3 Communications Corporation, New York, NY (US)

( * ) Notice: Subject to any disclaimer, the term of this patent is extended or adjusted under 35 U.S.C. 154(b) by 1723 days.

(21) Appl. No.: 11/745,558

(22) Filed: May 8, 2007

(65) Prior Publication Data

US 2008/0282252 A1    Nov. 13, 2008

(51) Int. Cl.
*G06F 9/46* (2006.01)
*G06F 9/52* (2006.01)

(52) U.S. Cl.
CPC ....................... *G06F 9/52* (2013.01)
USPC .......................... 718/104; 718/106

(58) Field of Classification Search
None
See application file for complete search history.

(56) References Cited

U.S. PATENT DOCUMENTS

| | | | |
|---|---|---|---|
| 5,340,056 A * | 8/1994 | Guelman et al. ............. | 244/3.16 |
| 5,655,081 A | 8/1997 | Bonnel et al. | |
| 5,784,636 A | 7/1998 | Rupp | |
| 5,794,062 A | 8/1998 | Baxter | |
| 5,963,447 A * | 10/1999 | Kohn et al. ....................... | 700/49 |
| 6,023,742 A | 2/2000 | Ebeling et al. | |
| 6,112,023 A | 8/2000 | Dave et al. | |
| 6,151,309 A | 11/2000 | Busuioc et al. | |
| 6,192,354 B1 * | 2/2001 | Bigus et al. ....................... | 706/46 |
| 6,263,358 B1 * | 7/2001 | Lee et al. ....................... | 718/100 |
| 6,282,627 B1 | 8/2001 | Wong et al. | |
| 6,353,841 B1 | 3/2002 | Marshall et al. | |
| 6,529,934 B1 | 3/2003 | Kawamura et al. | |
| 6,748,451 B2 * | 6/2004 | Woods et al. ................. | 709/248 |
| 6,976,150 B1 | 12/2005 | Uht et al. | |
| 7,007,264 B1 | 2/2006 | Baxter | |
| 7,020,701 B1 * | 3/2006 | Gelvin et al. ................. | 709/224 |
| 2007/0159354 A1 * | 7/2007 | Rosenberg ..................... | 340/902 |

OTHER PUBLICATIONS

Krauter et al. A taxonomy and survey of grid resource management systems for distributed computing. [online] (Sep. 17, 2001). John Wiley & Sons, Ltd., pp. 135-164. Retrieved From the Internet <http://citeseerx.ist.psu.edu/viewdoc/download?doi=10.1.1.60.8387&rep=rep1 &type=pdf>.*

* cited by examiner

*Primary Examiner* — Emerson Puente
*Assistant Examiner* — Mehran Kamran
(74) *Attorney, Agent, or Firm* — Hovey Williams LLP

(57) ABSTRACT

A computing system (10) includes a plurality of hardware computing resources (12-36) controlled at least in part by a plurality of autonomous computing agents (40,42,44). Each autonomous computing agent (40,42,44) includes or has access to operating information including processing information (46), resource information (48), optimization information (50), and communication information (52). The computing agents (40,42,44) collaborate to optimize performance of the system (10) and to assign computing tasks to the resources (12-36) according to a predetermined strategy. The predetermined strategy may seek to optimize speed, power, or communication efficiency of the system 10. Each agent (40,42,44) may optimize performance of the system (10) by assigning tasks to best-fit resources or by reconfiguring one or more resources. The agents (40,42,44) may collaborate to optimize performance of the system (10) by sharing resource and task information and assigning tasks to best-fit resources based on the shared information, reconfiguring one or more resources based on the shared information, or both.

29 Claims, 4 Drawing Sheets

HETEROGENEOUS RECONFIGURABLE AGENT COMPUTE ENGINE (HRACE)

BACKGROUND

1. Field

Embodiments of the present invention relate to reconfigurable computing systems. More particularly, embodiments of the invention involve a reconfigurable computing system that employs intelligent computing agents for optimizing system performance by autonomously and strategically assigning computing tasks to a pool of computing resources.

2. Description of Related Art

Many time-critical computing applications are best served by a heterogeneous pool of computing hardware resources, including general purpose resources and specialized resources adapted to perform one or more particular computing tasks in an efficient manner. In certain military applications, for example, data must be gathered and analyzed in a manner that allows for a timely and appropriate response to the gathered data. Analyzing the gathered data may be very rigorous and time-consuming if it involves, for example, signal processing or similar math-intensive tasks. It will be appreciated that this challenge is further complicated if the nature of the computing tasks change over time. Using dedicated hardware resources, such as specialized signal processing hardware, can substantially reduce the amount of time required to perform such tasks by completing the tasks in a timely manner and freeing general purpose resources, such as general purpose processors, to perform less rigorous algorithms or manage the flow of tasks through the system.

Unfortunately, use of pre-allocated, independent collections of specialized hardware resources can be inefficient in cost, power, and size because of the dynamic nature of the requirements of some applications. A pool of hardware resources that are well adapted to efficiently perform a first set of tasks may not be well adapted to perform a second set of tasks. Although one or more human operators could, in principle, manage the resources to help overcome this problem, using a human operator is costly, results in operator overload, and is only useful in slower dynamic situations. Accordingly, there is a need for an improved computing system that does not suffer from the problems and limitations of the prior art.

SUMMARY OF THE INVENTION

Embodiments of the present teachings provide an improved heterogeneous reconfigurable agent compute engine that does not suffer from the problems and limitations of the prior art. Particularly, embodiments of the present teachings provide a processing system comprising a plurality of computing hardware resources and a plurality of autonomous computing agents for collaboratively assigning computing tasks to the resources and optimizing performance of the processing system.

An exemplary system incorporating principles of the present teachings includes a first autonomous computing agent implemented by at least one of the plurality of hardware resources and a second autonomous computing agent implemented by at least one of the plurality of hardware resources. Processing information is accessible by at least one of the first and second computing agents and includes computing requirements for carrying out computing tasks. Resource information is also accessible by at least one of the first and second computing agents and includes characteristics of at least one of the plurality of computing resources. The first computing agent and the second computing agent are operable to use the processing information and the resource information to collaboratively assign computing tasks to the plurality of resources and/or optimize performance of the system according to a predetermined strategy.

Communication information may also be accessible to at least one of the first and second computing agents and may include resource interconnect information, communication protocol information, and communication speed information.

These and other important aspects of the present invention are described more fully in the detailed description below.

BRIEF DESCRIPTION OF THE DRAWINGS

Preferred embodiments of the present invention are described in detail below with reference to the attached drawing figures, wherein.

DETAILED DESCRIPTION

Figure 1:
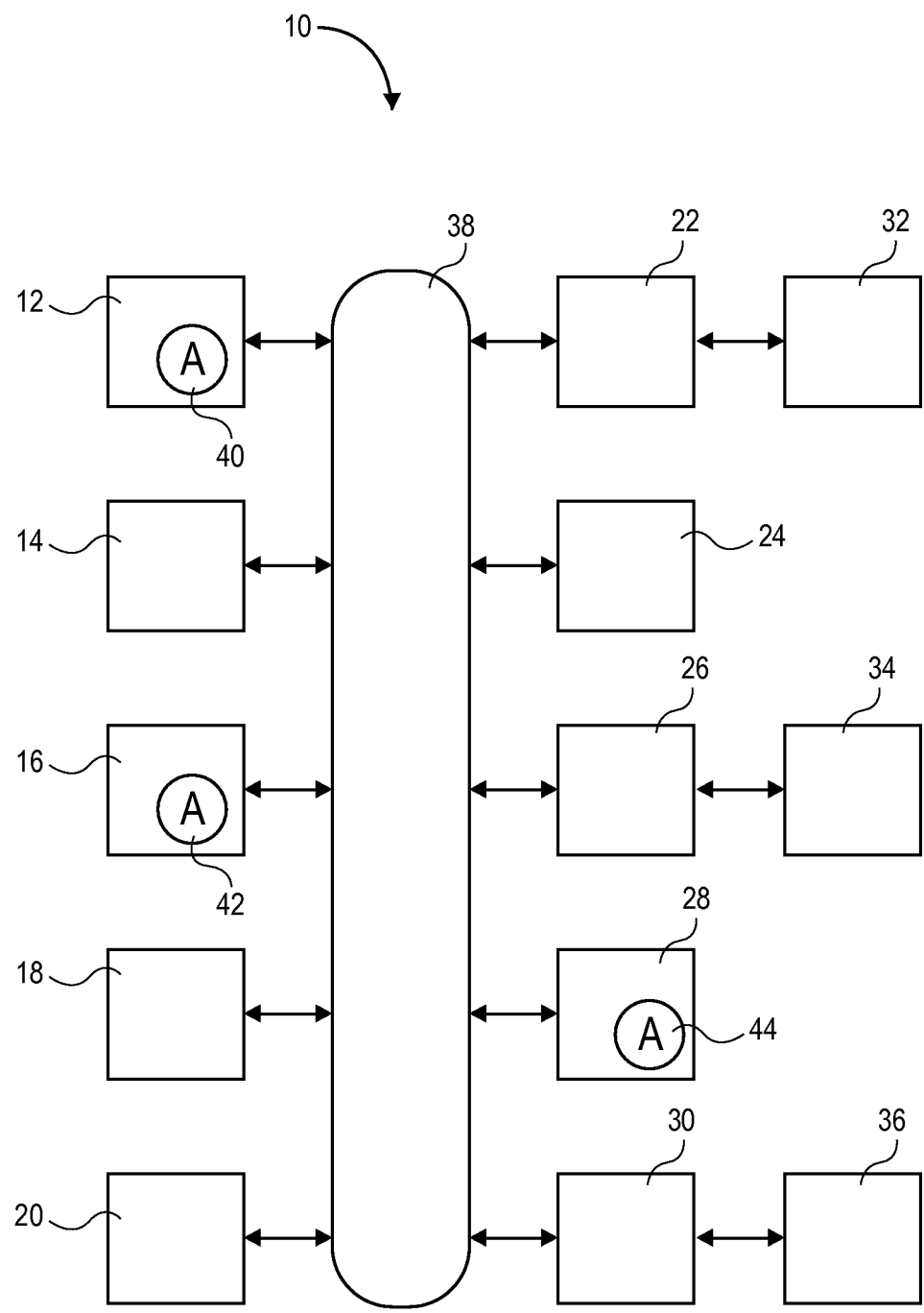
FIG. 1 is a schematic diagram of an exemplary computing system incorporating principles of the present teachings.

A computing system incorporating principles of the present teachings is illustrated in FIG. 1 and designated generally by the reference numeral 10. The system 10 comprises a plurality of computing resources, including a plurality of hardware computing resources 12-36 interconnected at least in part via a communications network 38. The hardware resources 12-36 may include virtually any device capable of storing and/or manipulating data or otherwise performing or assisting in performing computational tasks including digital devices, analog devices, and mixed-signal devices.

Exemplary hardware computing resources include general purpose processors; specialized processors such as digital signal processors and graphics processors; programmable logic devices such as field programmable gate arrays (FPGAs) and complex programmable logic devices (CPLDs); digital and/or analog filters; data storage mediums such as volatile memory, non-volatile memory, and hard drives or other mass storage devices; analog-to-digital converters, and so forth.

The communications network 38 includes one or more communications mediums interconnecting at least some of the hardware resources 12-36. The network 38 may include a standard or customized data communications bus or plurality of busses including, for example, serial busses such as the Universal Serial Bus or IEEE 1394 bus, or parallel data busses. Each resource may be connected to a plurality of other resources via one or more data busses, directly to one or more other resources, or both. The network 38 may include a wired communications medium, a wireless communications medium, or combinations thereof. The present teachings contemplate various networking topologies including, for example, bus, star, full mesh, partial mesh, ring, and hybrid topologies such as tree topologies.

The system 10 may be confined to a relatively small geographic area, such as a building or a room within a building, or may be dispersed over a relatively large geographic area, such as across a country or around the world. The system 10 may be implemented on a single platform or across two or more platforms. Exemplary platforms include aerial vehicles such as airplanes and helicopters; stationary ground platforms such as buildings or temporary ground stations; ground-based vehicles such as cars, trucks, and tanks; and water-borne vessels such as ships and submarines. As explained below in greater detail, the present teachings enable multiple systems similar to the system 10 to be dynamically interconnected.

The present teachings are useful with both heterogeneous and homogeneous systems. A heterogeneous system includes a plurality of substantially dissimilar hardware computing resources such as, for example, general purpose processors with varying capabilities, a plurality of specialized processors each adapted to perform a unique task, different types of filters, resources with dissimilar communication capabilities, and so forth. A homogeneous system includes a plurality of substantially similar hardware computing resources, such as general purpose processors with identical or nearly identical capabilities. While the present teachings are useful with both heterogeneous and homogeneous systems, the present teachings advantageously address challenges presented by heterogeneous systems by providing, among other things, distributed and/or compartmentalized control of the computing system resources. A first computing agent may manage a first group or class of resources, for example, while a second computing agent may manage a second group or class of resources, and so forth.

The present teachings are useful with both static and dynamic systems. A static system includes substantially the same hardware resources over time, while a dynamic system includes a pool of hardware resources that changes over time. While the present teachings are useful with both types of systems, the present teachings advantageously address challenges presented by dynamic systems by providing, among other things, a scalable control solution. When the number of resources in or available to the system 10 increases, for example, additional computing agents may be employed, and when the number of resources in or available to the system 10 decreases, the number of computing agents may be reduced. It will be appreciated that where a computing agent is implemented by a resource of the system 10, removing the computing agent increases the capability of that resource to perform other computing tasks.

The system 10 illustrated in FIG. 1 includes a plurality of autonomous computing agents 40,42,44 that autonomously and collaboratively assign computing tasks to the resources 12-36 and optimize the system 10 according to a predetermined strategy. The computing agents 40,42,44 are autonomous because they do not require input from users or from other computing elements to operate. The computing agents 40,42,44 are collaborative because they are operable—but not bound—to control the system 10 in a cooperative manner by, for example, exchanging information and task responsibilities.

Each computing agent 40,42,44 includes a bundle of functions that may be implemented with software, hardware, or a combination of software and hardware. A software implementation may include a computer program executed by a general purpose processor, and a hardware implementation may include a programmable logic device or an application specific integrated circuit designed to implement the agent functions. Each computing agent 40,42,44 may be implemented on a resource of the system 10 (as illustrated in FIG. 1), or may be implemented externally to the system 10. When implemented on a resource of the system 10, a computing agent 40,42,44 may use only a portion of the resource on which it is implemented, such that the resource may also be used to perform other functions. A single resource may implement two or more computing agents. In certain situations, however, it may be desirable to implement each agent on a separate resource to take advantage of agent placement strategies to increase efficiency of the system 10. Each of the computing agents 40,42,44, for example, may be implemented on a hardware resource of the system 10 in a manner that maximizes communication flow between the computing agents 40,42,44 and the resources.

As explained above, the computing agents 40,42,44 control the system 10 by collaboratively assigning computing tasks to the hardware resources 12-36 of the system 10. Control of the system 10 may be distributed across the computing agents according to any of various control distribution schemes, including hierarchical and peer schemes. An exemplary hierarchical control distribution scheme involves a master computing agent assigning computing tasks to or otherwise directing the operation of one or more slave computing agents. An exemplary peer control distribution scheme may involve a plurality of computing agents with substantially equal control responsibilities. The computing agents 40,42, 44 may communicate according to a standard or customized network communications architecture such as a peer-to-peer or client/server architecture, and according to a standard or customized network communications protocol such as Ethernet, token-ring, or other protocols.

The computing agents 40,42,44 may be uniform and scalable. The agents 40,42,44 are uniform if they are based on the same source code or hardware design, and are scalable if the number of computing agents changes according to changes in system demands, such as the total number of hardware resources or the frequency at which computing tasks are received. In the system 10, the three illustrated computing agents 40,42,44 may be ideal for efficient performance at a particular task demand level. If the number of hardware computing resources or the task demand level were reduced, a single computing agent may suffice to efficiently assign computing tasks to the resources. If the number of computing resources or the task demand level were to increase, more computing agents may be needed to efficiently manage the increased load, in which case more computing agents would be created.

In an exemplary implementation, the number of computing agents tracks the number of computing resources, such as where each computing resource is assigned a computing agent. There may be, for example, two resources and two agents, three resources and three agents, four resources and four agents, and so forth up to N agents and N resources. In this scenario, each computing agent may be primarily responsible for a single resource, and the number of agents will increase or decrease according to fluctuations in the number of resources. The agents collaborate to share tasks to maximize the efficiency of the system by, for example, passing tasks from an over-utilized resource to an under-utilized resource.

Any of a variety of scaling schemes or algorithms may be used to adjust the number of computing agents in the system 10. One or more of the computing agents 40,42,44 themselves may be operable to scale their numbers, such as where a first computing agent has responsibility for monitoring the need for agents and creating or destroying other computing agents accordingly. Alternatively, a resource that is not hosting one of the computing agents 40,42,44 may be tasked with scaling the number of agents 40,42,44 in the system 10. Furthermore, a computing device or resource separate from the system 10 may scale the number of computing agents by monitoring the system 10 and creating and/or destroying computing agents.

Figure 2:
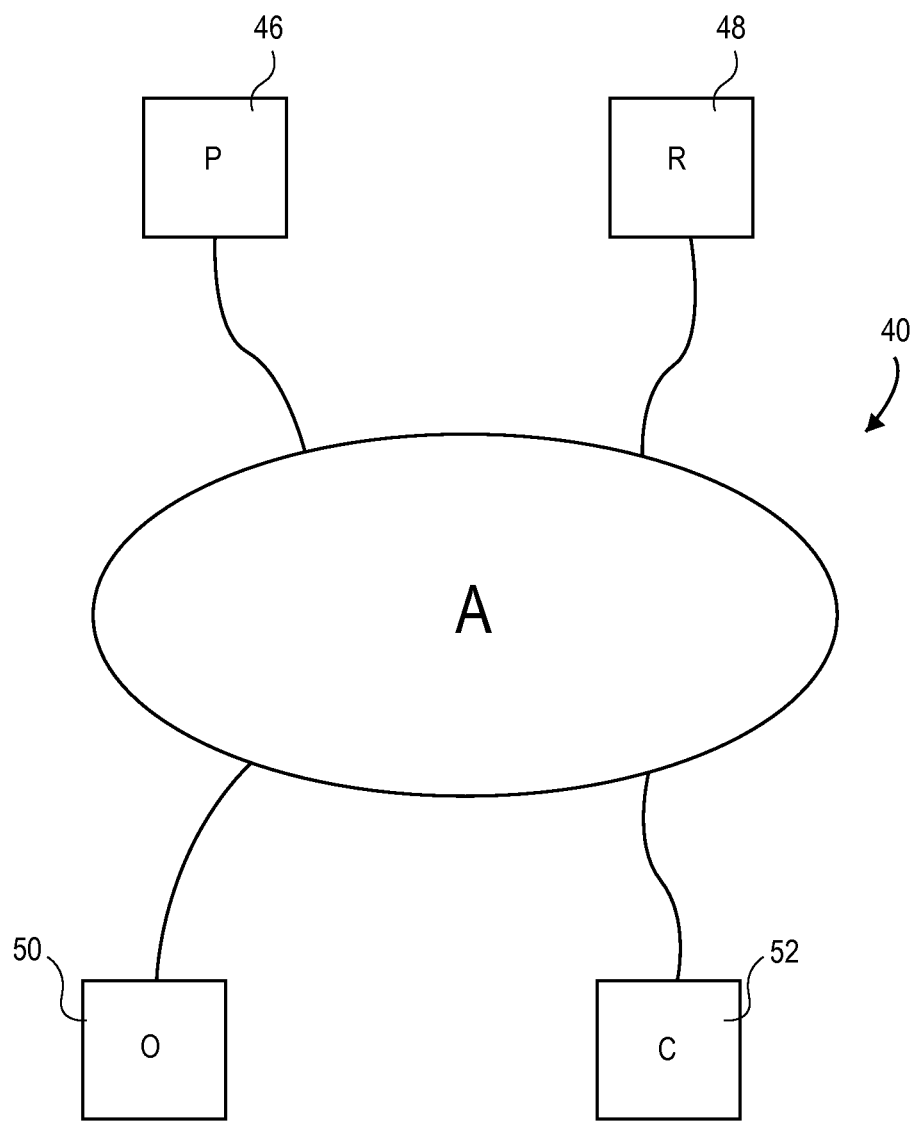
FIG. 2 is a schematic diagram of an autonomous computing agent of the system of FIG. 1, the computing agent associated with various bodies of operating information.

With reference to FIG. 2, each computing agent 40,42,44 includes or has access to operating information, the operating information including processing information 46, resource information 48, optimization information 50, and communication information 52. Each type of information may be embodied in data stored in a memory device or mass storage device. While the various bodies of information 46,48,50,52 are depicted in FIG. 2 as separate entities, it will be appreciated that they may be logically and/or physically combined. To facilitate the present discussion, computing agent 40 is discussed at times without reference to computing agents 42 and 44 with the understanding that such teachings are equally applicable to agents 42 and 44.

The processing information 46 includes information about computing tasks performed by the system 10 and algorithms and resources that may be used to execute the tasks. Task information may include a list of computing tasks performed by the system 10, the number of bits required to perform a task; the types of operations required to perform the task (e.g., integer operations, floating point operations, complex operations, and so forth); mapping efficiency of tasks or algorithms to different types of resources; and similar information. The information may include a list of algorithms performed by the resources and/or algorithms associated with each of various tasks. There may be two or more algorithms associated with a single task, such as where two algorithms may be required to complete a task or where any of two or more algorithms may be used to complete a task.

Exemplary tasks performed by the system 10 and included in the processing information 46 may include detecting signals, classifying signals, analyzing signals, capturing images, processing images, determining or tracking a location using a global positioning system (GPS) receiver, and so forth. The processing information may indicate one or more algorithms associated with each task, such as where a Fast Fourier Transform (FFT) is associated with the task of analyzing signals. The processing information 46 may also indicate which resources are preferred or required to perform each task, such as where a class of digital signal processors are preferred to perform the FFT.

The resource information 48 includes information about available or potentially available computing resources. The resource information 48 may include a list of the hardware resources 12-36 and/or characteristics of each resource relative to system operation and optimization. Such characteristics may include the ability of each resource to be reconfigured and the time required for reconfiguration; the ability and likelihood of resources to enter and leave the system; resource speed including memory read/write time; and the ability of each resource to multitask and/or perform subprocessing tasks. These are but a few examples of resource characteristics that may be included in the resource information 48.

The communication information 52 includes information about the ability of the hardware computing resources 12-36 to share data and otherwise communicate with each other. The communication information may include a map or description of the communications scheme interconnecting the hardware resources 12-36, communications protocols, and the characteristics of the communication mediums. The communication information 52 is especially useful in systems where one or more resources are not connected to a common data communications bus. In the system 10, for example, resource 32 is in communication with resource 22, resource 34 is in communication with resource 26, and resource 36 is in communication with resource 30. All of this information may be included in the communication information 52 such that data can be efficiently transferred between resources 32, 34, and 36 if necessary. The communication information 50 included in or accessible by each computing agent 40,42,44 may include communication information associated with all of the resources 12-36 or only a portion of the resources 12-36.

The optimization information 50 includes information about procedures, strategies, and algorithms for optimizing system behavior, including processing requirements to allow basic trades between allocation of the hardware resources 12-36 required to optimize the system and the remaining system resources available to solve the computing tasks. Optimization strategies may seek to optimize power, communications, speed, and so forth. According to an exemplary power optimization strategy, the computing agents 40,42,44 assign computing tasks to resources in a manner that minimizes power consumption. According to an exemplary speed optimization strategy, the computing agents 40,42,44 assign computing tasks to resources in a manner that minimizes the time required to perform the tasks. A user may implement a particular strategy by providing optimization information 48 embodying principles of that strategy.

The operating information 46,48,50,52 may be static or dynamic. Static information may be sufficient, for example, where the resource pool is static. Similarly, dynamic operating information may be beneficial or required where the system 10 is dynamic. Where new resources are added to the system, for example, the processing information 46 may be updated to reflect new processing capabilities (if any) brought to the system 10 by the new resources; the resource information 48 may be updated to reflect characteristics of the new resources; the optimization information 50 may be updated to reflect any optimization options presented by the new resources; and the communications information 52 may be updated to reflect how the new resources are connected to the system 10. Similarly, if a resource is removed, each body of information may be updated to reflect this change. These are but two examples of how and when dynamic operating information may be updated. Where one or more of the bodies of information 46,48,50,52 is dynamic, one or more of the computing agents 40,42,44 may be tasked with updating the information, or the information may be updated from an external entity separate by the agents 40,42,44, or even separate from the system 10.

Each of the computing agents 40,42,44 may use the optimization information to assign tasks to best-fit resources; sub-divide tasks and assign sub-tasks to best-fit resources; reconfigure resources or groups of resources to meet task needs; communicate with other computing agents to determine what resources are available; and anticipate resource utilization to make optimization decisions according to the anticipated utilization.

Using the optimization information 50 and anticipated task demand level, for example, the computing agent 40 may identify a target optimization granularity and choose an optimization strategy or algorithm accordingly. If the computing agent 40 determines that the number of available resources and/or the task demand level is expected to be below a predetermined level, for example, the computing agent 40 may implement an optimization algorithm that involves reconfiguring multiple hardware resources, such as a plurality of programmable logic devices, to more efficiently execute one or more tasks. Reconfiguring multiple resources may result in the most efficient use of the system 10 once reconfiguration is complete, but may require the largest amount of resources and time to perform, and thus may come at a substantial cost in resource availability during reconfiguration. Not only are the resources undergoing reconfiguration at least partially unavailable for use, but the resources performing the reconfiguration are also unavailable to perform other tasks.

If the computing agent 40 determines that available resources will be relatively low, the computing agent may implement an optimization algorithm that involves reconfiguring a single hardware resource, such as a single programmable logic device. Reconfiguring a single resource will typically require less time and resources than reconfiguring a plurality of resources. If the computing agent 40 determines that available resources will be very low, the computing agent may implement a minimum optimization algorithm that does not involve resource reconfiguration, but rather assigns tasks to resources in their current state according to a best-fit paradigm as the tasks are received.

As mentioned above, the computing agents 40,42,44 are operable to collaborate to coordinate task allocation and optimize system performance. The computing agents 40,42,44 may collaborate according to any of various collaboration paradigms based on, for example, resource allocation, task allocation, or optimization. According to an exemplary resource allocation paradigm, each agent 40,42,44 manages one or more of the hardware resources 12-36. Each agent 40,42,44 monitors its respective resources and assigns incoming tasks to the resources according to the operation information. The agents 40,42,44 may collaborate by sharing information about available resources, tasks, task demand level, and so forth.

According to a first exemplary scenario, computing agent 40 manages resources 12,14,22, and 32; computing agent 42 manages resources 16,24,26, and 34; and computing agent 44 manages resources 18, 20, 28, 30, and 36. The computing agents 40,42,44 may share task demand level information and trade computing tasks according to comparisons. If computing agents 40 and 42 determine that the resource pool of computing agent 40 is utilized at a higher rate more than the resource pool of computing agent 42, computing agent 42 may transfer computing tasks to agent 40 so that both computing agents are utilizing their resource pools at about the same level. The computing agents 40,42,44 may trade computing tasks according to the efficiency of particular tasks versus the resources in each computing agent's pool of resources. For example, if computing agent 40 originally receives or is assigned tasks A and B and computing agent 42 originally receives or is assigned tasks C and D, the computing agents 40,42 may determined that assigning tasks A and D to the resource pool associated with computing agent 40 and assigning tasks B and C to computing agent 42 would result in all tasks being accomplished in a manner that furthers the optimization paradigm (e.g., more quickly, consuming less power, or with the least burden on communications mediums).

The resources may be assigned to each computing agent 40,42,44 randomly or according to one or more criteria. By way of example, each computing agent 40,42,44 may manage a particular type of resource (general purpose processors, specialized processors, memory devices, etc.), or may manage resources to optimize communications by managing resources that are communicatively "close."

According to the task allocation paradigm, each computing agent 40,42,44 manages a set of tasks as opposed to a pool of resources. Computing agent 40 may manage all tasks associated with detecting RF signals, computing agent 42 may manage all tasks associated with classifying detected RF signals, and computing agent 44 may manage all tasks associated with decoding detected and classified RF signals. Each computing agent 40,42,44 would have access to each of the hardware resources 12-36 and would assign tasks to resources that are best suited for the particular task.

The computing agents 40,42,44 are operable to collaborate to ensure that the hardware resources 12-36 are used in a way that furthers the system's optimization goals. Computing agent 40, for example, may determined that using resources 22, 26, and 30 would maximize the optimization the performance of its tasks, while computing agent 42 may determined that using resources 26, 30, and 18 would optimize the performance of its tasks. Instead of one of the computing agents 40,42 abandoning resources 26 and 30 entirely, each computing agent 40,42 may determine an alternative efficiency level at which it would operate using either or neither of resources 26 and 30, compare the determined alternative efficiency levels, and collaboratively decide which of the computing agents 40,42 will use resources 26 and 30 based on what would maximize the efficiency of the overall system 10.

Figure 3:
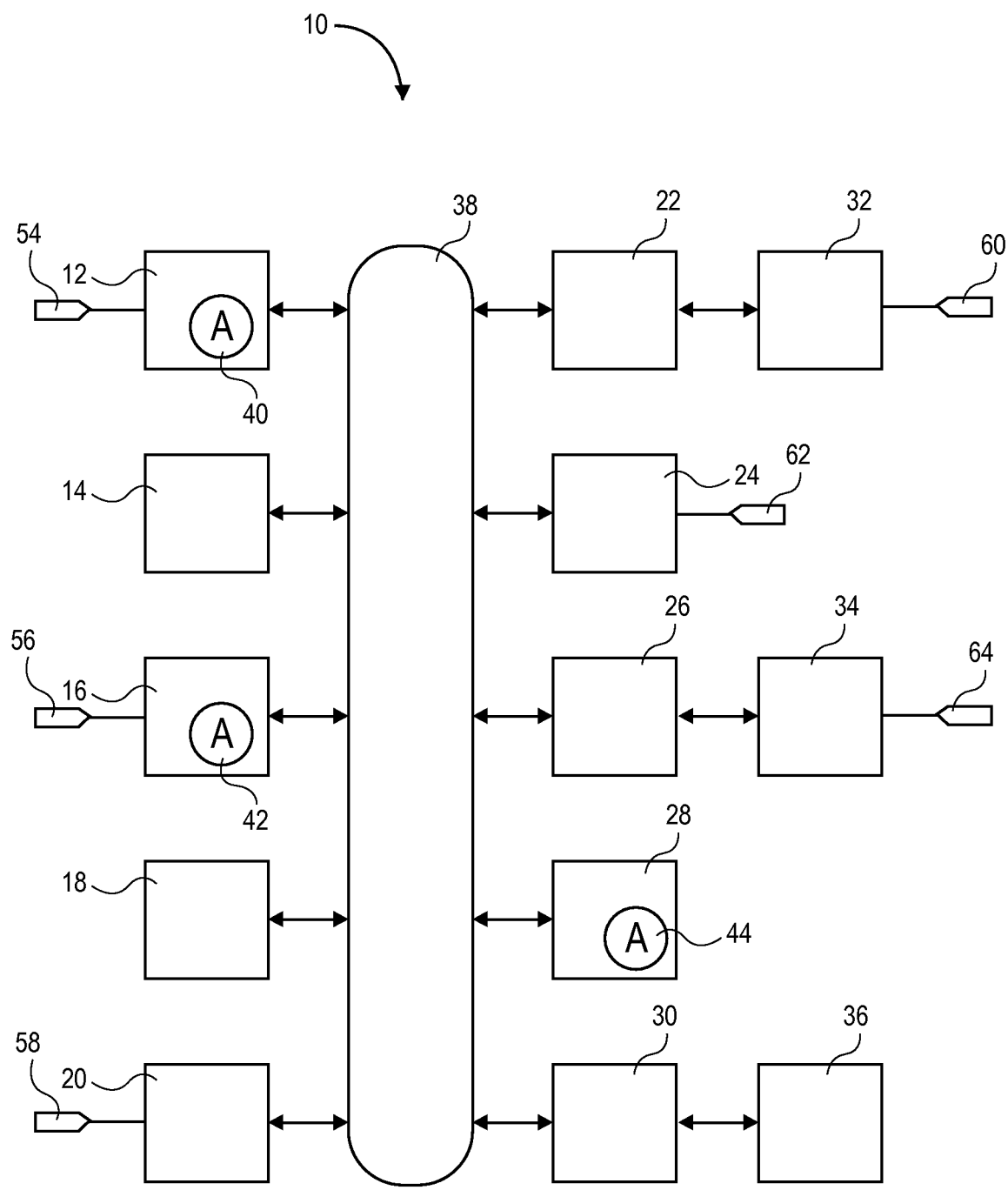
FIG. 3 illustrates the computing system of FIG. 1 including a plurality of distributed data inputs.

With reference to FIG. 3, the system 10 may include a plurality of distributed inputs 54-64. The inputs 54-64 may receive communications from external computing devices or may collect raw data. Exemplary input devices that collect raw data include antennas, digital imaging devices, or other sensors. Each computing agent 40,42,44 may be responsible for monitoring a given set of the inputs or data collection devices and managing tasks resulting from data collected therefrom. The computing agents 40,42,44 may receive predefined tasks from one or more external entities via the inputs 54-64, or may determine an appropriate task based on raw data received via the inputs 54-64.

The present teachings enable smooth integration of multiple systems similar to the system 10. If two such systems form a communications link, the computing agents in each system would discover the computing agents and resources in the other system and may collaborate according to the collaboration principles set forth above.

Figure 4:
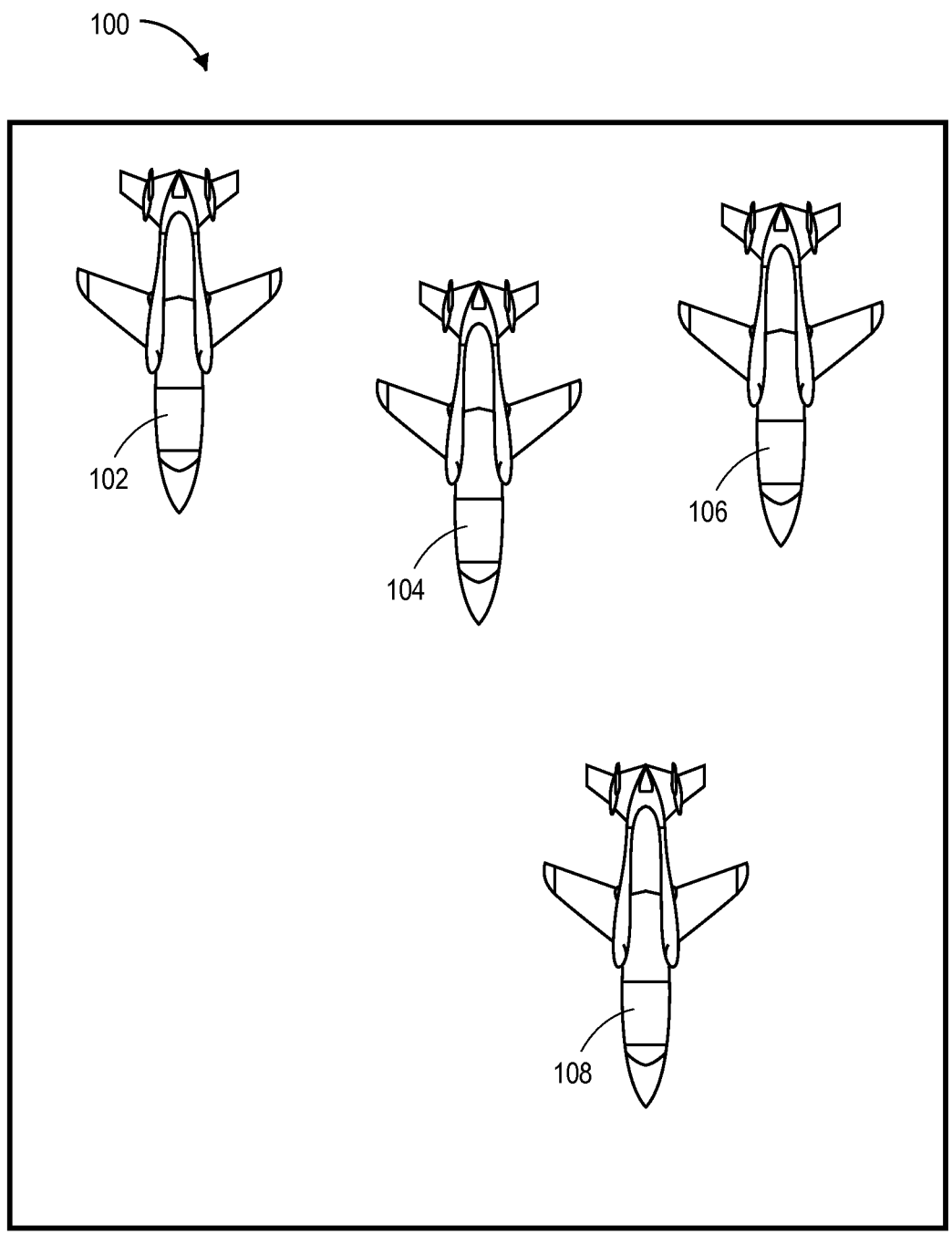
FIG. 4 illustrates an exemplary implementation of the computing system of FIG. 1, including a plurality of aerial vehicles.

The present teachings may be used in any of a variety of settings. A first exemplary implementation is illustrated in FIG. 4, wherein principles of the present teachings are implemented in one or more aerial vehicles, such as a system 100 of unmanned aerial vehicles (UAVs) 102,104,106,108. Each UAV 102,104,106,108 may house a reconfigurable computing system similar to the system 10 including a plurality of hardware computing resources and a plurality of computing agents. The computing agents in a first UAV may discover and communicate with the agents of a second UAV when, for example, the UAVs are within a predetermined range of each other. Alternatively, each UAV may include a single computing agent such that the system 100 of UAVs may be analogous to the system 10. The UAVs may sense RF signals or capture digital images for processing, wherein the processing tasks may be assigned to any of various UAVs.

In a second exemplary implementation, principles of the present teachings are implemented in a computer network, such as a series of local area networks (LANs) interconnected by, for example, the Internet. Computing tasks may be distributed to each LAN, where a computing agent (or plurality of computing agents) assign the tasks to hardware computing resources based on a predetermined strategy.

Although the invention has been described with reference to the preferred embodiments illustrated in the attached drawings, it is noted that equivalents may be employed and substitutions made herein without departing from the scope of the invention as recited in the claims.

Having thus described a preferred embodiment of the invention, what is claimed as new and desired to be protected by Letters Patent includes the following:

The invention claimed is:

1. A processing system comprising:
    a plurality of computing hardware resources;
    a first autonomous computing agent implemented by at least one of the plurality of computing hardware resources;
    a second autonomous computing agent implemented by at least one of the plurality of computing hardware resources; and
    an input device for collecting raw data to be managed by at least one of the first and second computing agents;
    the first computing agent and the second computing agent operable to use processing information, including computing requirements for carrying out computing tasks and resource information including characteristics of at least one of the plurality of computing hardware resources, to collaboratively assign computing tasks to the plurality of resources according to a predetermined strategy each computing agent operable to optimize task allocation according to a task demand level by reconfiguring a single computing hardware resource if the task demand is at a first level and reconfiguring a plurality of computing hardware resources if the task demand is at a second level whereby the first level is lower than the second level;
    at least one of the first or second autonomous computing agents being able to monitor a task demand level and a number of the computing hardware resources and generate additional computing agents if the task demand level or the number of computing hardware resources exceeds a predetermined threshold.

2. The processing system as set forth in claim 1, the plurality of computing hardware resources including resources chosen from the group consisting of general purpose processors, specialized processors, programmable logic devices, and memory elements.

3. The processing system as set forth in claim 1, the characteristics including characteristics chosen from the group consisting of types of operations performed, data storage capacity, reconfigurability, speed, and input/output parameters.

4. The processing system as set forth in claim 1, the first computing agent and the second computing agent in communication with each other and operable to share processing and resource information and collaboratively assign computing tasks to the plurality of resources according to the predetermined strategy and shared information.

5. The processing system as set forth in claim 4, the first computing agent being operable to monitor and assign tasks to a first portion of the plurality of computing resources, and the second computing agent being operable to monitor and assign tasks to a second portion of the plurality of computing resources.

6. The processing system as set forth in claim 1, further comprising communication information accessible by at least one of the first and second computing agents, the communication information including information chosen from the group consisting of resource interconnect information, communications protocol information, and communication bandwidth information.

7. The processing system as set forth in claim 1, further comprising optimization information accessible by at least one of the first and second computing agents, the optimization information including optimization algorithms and resource requirements for performing the optimization requirements.

8. The processing system as set forth in claim 1, at least one computing agent operable to detect a change in the number of available computing resources, and assign computing tasks to the available resources according to the predetermined strategy and according to the change in number of resources.

9. The processing system as set forth in claim 1, the strategy being chosen from the group consisting of a speed optimization strategy, a communication optimization strategy, and a power optimization strategy.

10. The processing system as set forth in claim 1, the strategy involving assigning the task to computing resources so that task requirements substantially match resource characteristics.

11. The processing system as set forth in claim 1, at least one of the computing agents being able to detect a new computing agent, share processing and resource information with the new agent, share resource monitoring and tasking responsibilities with the new computing agent, and collaborate with the new computing agent to assign computing tasks to the plurality of resources according to the predetermined strategy.

12. The processing system as set forth in claim 1, at least one of the first and second agents being defined by software implemented on a general purpose processor.

13. The processing system as set forth in claim 1, at least one of the first and second agents being defined by an electronic circuit design implemented on a device chosen from the group consisting of a programmable logic device and an application specific integrated circuit.

14. The processing system as set forth in claim 1, further comprising one or more airborne vehicles housing the plurality of computing resources.

15. The processing system as set forth in claim 14, the one or more airborne vehicles including an unmanned vehicle.

16. The processing system as set forth in claim 1, further comprising one or more ground-based vehicles housing the plurality of computing resources.

17. A processing system comprising:
    a plurality of computing hardware resources;
    a first autonomous computing agent implemented by at least one of the plurality of hardware resources;
    a second autonomous computing agent implemented by at least one of the plurality of hardware resources;
    processing information accessible by at least one of the first and second computing agents, the processing information including computing requirements for carrying out computing tasks;
    resource information accessible by at least one of the first and second computing agents, the resource information including characteristics of at least one of the plurality of computing hardware resources;
    communication information accessible by at least one of the first and second computing agents, the communication information including resource interconnect information and communication bandwidth information;
    an input device for collecting raw data to be managed by at least one of the first and second computing agents; and
    optimization information accessible by at least one of the first and second computing agents, the optimization information including optimization schemes and resource requirements for implementing the optimization schemes,
    the first computing agent and the second computing agent operable to use the processing information, the resource information, the communication information, and the optimization information to collaboratively assign computing tasks to the plurality of resources according to a predetermined strategy chosen from the group consisting of a speed optimization strategy and a power optimization strategy.

each computing agent operable to optimize task allocation according to a task demand level by reconfiguring a single computing resource if the task demand is at a first level and reconfiguring a plurality of computing hardware resources if the task demand is at a second level whereby the first level is lower than the second level;

at least one of the first or second computing agents being able to monitor a task demand level and a number of the computing hardware resources and generate additional computing agents if the task demand level or the number of computing hardware resources exceeds a predetermined threshold.

18. The computing system as set forth in claim 17, at least one of the first or second computing agents being able to share one or more of the processing information, the resource information, the communication information, and the optimization information with the additional computing agents and collaborate with the additional computing agents to assign computing tasks to the plurality of resources according to the predetermined strategy.

19. The processing system as set forth in claim 17, the first computing agent being operable to monitor and assign tasks to a first portion of the plurality of hardware resources, and the second computing agent being operable to monitor and assign tasks to a second portion of the plurality of hardware resources.

20. The processing system as set forth in claim 17, at least one computing agent operable to detect a change in the number of available computing hardware resources, and assign computing tasks to the available resources according to the predetermined strategy and according to the change in number of resources.

21. The processing system as set forth in claim 17, the strategy being chosen from the group consisting of a speed optimization strategy, a communication optimization strategy, and a power optimization strategy.

22. The processing system as set forth in claim 17, at least one of the computing agents being able to detect when a new computing agent is part of the system, share processing and resource information with the new agent, share resource monitoring and tasking responsibilities with the new computing agent, and collaborate with the new computing agent to assign computing tasks to the plurality of resources according to the predetermined strategy.

23. The processing system as set forth in claim 17, at least one of the first and second agents being defined by software implemented on a general purpose processor.

24. The processing system as set forth in claim 17, at least one of the first and second agents being defined by an electronic circuit design implemented on a device chosen from the group consisting of a programmable logic device and an application specific integrated circuit.

25. The processing system as set forth in claim 17, further comprising one or more airborne vehicles housing the plurality of computing hardware resources.

26. The processing system as set forth in claim 25, the one or more airborne vehicles including an unmanned vehicle.

27. The processing system as set forth in claim 17, further comprising one or more ground-based vehicles housing the plurality of computing hardware resources.

28. The processing system as set forth in claim 1, wherein the input device is selected from the group consisting of antennas, digital imaging devices, and sensors.

29. The processing system as set forth in claim 17, wherein the input device is selected from the group consisting of antennas, digital imaging devices, and sensors.

* * * * *